(12) United States Patent
Fujiwara et al.

(10) Patent No.: US 6,684,694 B2
(45) Date of Patent: Feb. 3, 2004

(54) FLOW SENSOR, METHOD OF MANUFACTURING THE SAME AND FUEL CELL SYSTEM

(75) Inventors: Takeshi Fujiwara, Kyoto (JP); Syo Sasaki, Kyoto (JP); Kenichi Nakamura, Tokyo (JP); Tokudai Neda, Tokyo (JP)

(73) Assignee: Omron Corporation, Kyoto (JP)

( * ) Notice: Subject to any disclaimer, the term of this patent is extended or adjusted under 35 U.S.C. 154(b) by 43 days.

(21) Appl. No.: 10/036,075

(22) Filed: Dec. 27, 2001

(65) Prior Publication Data

US 2002/0121137 A1 Sep. 5, 2002

(30) Foreign Application Priority Data

Dec. 28, 2000 (JP) ........................................ 2000-400407

(51) Int. Cl.$^7$ ................................................. G01F 1/68
(52) U.S. Cl. .................................................. 73/204.26
(58) Field of Search ........................ 703/204.16, 204.19, 703/204.26, 204.17, 204.11, 204.23; 136/225, 226

(56) References Cited

U.S. PATENT DOCUMENTS

| | | | |
|---|---|---|---|
| 4,884,443 A | * | 12/1989 | Lee et al. ................ 73/204.16 |
| 5,393,351 A | * | 2/1995 | Kinard et al. .............. 136/225 |
| 6,378,365 B1 | * | 4/2002 | Tu .......................... 73/204.26 |
| 6,460,411 B1 | * | 10/2002 | Kersjes et al. ........... 73/204.26 |
| 6,536,274 B1 | * | 3/2003 | Zushi et al. ............. 73/204.26 |

FOREIGN PATENT DOCUMENTS

| | | | |
|---|---|---|---|
| EP | 0937966 A2 | 8/1999 | ............ G01F/1/684 |
| JP | 10-311750 | 11/1998 | ............. G01F/1/68 |
| JP | 11-237266 | 8/1999 | ............. G01F/5/12 |
| JP | 11-258021 | 9/1999 | ............. G01F/1/68 |

* cited by examiner

Primary Examiner—Edward Lefkowitz
Assistant Examiner—Jewel V. Thompson
(74) Attorney, Agent, or Firm—Rosenthal & Osha L.L.P.

(57) ABSTRACT

In a flow sensor, a heater is provided in the middle of an insulation thin film stretched above a gap on a substrate. Temperature measuring elements, which in some embodiments are thermopiles, are provided on both sides of the same, and an ambient temperature measuring resistive element is provided on the top surface of the silicon substrate. The thermopiles in some embodiments are made of polysilicon and aluminum, and in some embodiments the polysilicon is doped with phosphorus (P). In some embodiments, the amount of phosphorus is determined such that temperature characteristics of the thermopiles and have an absolute value substantially equal to that of temperature characteristics attributable to factors other than the thermopiles and have a (positive or negative) sign opposite to that of the latter. Thus, the temperature characteristics of the thermopiles cancel the temperature characteristics attributable to factors other than the thermopiles.

15 Claims, 10 Drawing Sheets

FLOW SENSOR, METHOD OF MANUFACTURING THE SAME AND FUEL CELL SYSTEM

BACKGROUND OF INVENTION

The present invention relates to a flow sensor for detecting the flow amount and flow rate of a fluid, a method of manufacturing the same and a fuel cell system using the flow sensor.

FIGS. 1 and 2 are conceptual diagrams of a flow sensor 1 having a conventional structure. FIG. 2 is a sectional view taken along the line X1—X1 in FIG. 1. FIG. 1 shows a heater and a temperature measuring element in an exposed state, and FIG. 2 shows the same members covered with a protective film 10 or the like. In the flow sensor 1, a gap section 3 in the form of a recess is formed on a top surface of a silicon substrate 2; an insulating thin film 4 is provided on the top surface of the silicon substrate 2 such that it covers the gap section 3; and a part of the insulating thin film 4 forms a bridge section 5 in the form of a thin film over the gap section 3. The bridge section 5 is thermally insulated from the silicon substrate 2 by the space (air) in the gap section 3. A heater 6 is provided in the middle of a surface of the bridge section 5, and temperature measuring elements 7 and 8 are provided in respective positions which are symmetrical about the heater 6. An ambient temperature measuring resistive element 9 is provided on a surface of the insulating thin film 4 located outside the bridge section 5. Further, the silicon substrate 2 is coated with a protective film 10 such that the heater 6, temperature measuring elements 7 and 8, and ambient temperature measuring resistive element 9 are covered with the same.

Various elements are used as the temperature measuring elements 7 and 8. For example, Japanese unexamined patent publication No. S60-142268 disclosed the use of thin film resistors made of an iron-nickel alloy. In an article titled, "Low power consumption thermal gas-flow sensor based on thermopiles of highly effective thermoelectric materials", is disclosed the use of BiSb—Sb thermopiles as temperature measuring elements. Further, transistors or the like may be used as temperature measuring elements. The following description is based on an assumption that thermopiles formed from BiSb—Sb thermocouples are used as the temperature measuring elements 7 and 8.

When thermopiles formed from BiSb—Sb thermocouples are used as the temperature measuring elements 7 and 8, thin wires made of BiSb and thin wires made of Sb are alternately provided across edges of the bridge section to form a group of hot contacts 11 at points where the BiSb thin wires and Sb thin wires are connected in the bridge section 5, and to form a group of cool contacts 12 at points where the BiSb thin wires and Sb thin wires are connected outside the bridge section 5.

A voltage V1 output by the temperature measuring element 7 (a voltage across the same) and a voltage V2 output by the temperature measuring element 8 (a voltage across the same) are respectively expressed by Equations 1 and 2 as follows where n represents the quantities of the hot contacts 11 and cool contacts 12 of the temperature measuring elements (thermopiles) 7 and 8; Tc represents the temperature of the cool contacts 12 (which is equivalent to the ambient temperature at the time of measurement); Th1 represents the temperature of the hot contacts of the temperature measuring element 7; and Th2 represents the temperature of the hot contacts 11 of the temperature measuring element 8.

$$V1 = n \cdot a(Th1 - Tc) \quad \text{Equation 1}$$
$$V2 = n \cdot a(Th2 - Tc) \quad \text{Equation 2}$$

"a" represents a Seebeck coefficient.

The flow sensor 1 is placed in a channel 13 through which a fluid flows as shown in FIG. 3, and the outputs of the temperature measuring elements 7 and 8 are monitored with the heater 6 heated by a current applied thereto. When there is no wind, or when no gas flows, since the temperature distribution on the surface of the insulating thin film 4 is symmetric about the heater 6, as indicated by the solid line in FIG. 5, the temperature Th1 of the hot contacts of the temperature measuring element 7 and the temperature Th2 of the hot contacts of the temperature measuring element 8 are equal to each other because of the symmetry of their positions, and the voltage V1 output by the temperature measuring element 7 and the voltage V2 output by the temperature measuring element 8 are therefore equal to each other.

On the contrary, when a fluid flows from the temperature measuring element 7 toward the temperature measuring element 8 as indicated by the arrow in FIG. 4, the temperature distribution on the surface of the insulating thin film 4 is asymmetric, as indicated by the broken line in FIG. 5. Specifically, the temperature Th1 of the hot contacts of the temperature measuring element 7 located upstream decreases because the element is cooled by the flow of the fluid, and the output voltage $V1 = n \cdot a(Th1 - Tc)$ decreases. Meanwhile, the heat of the heater 6 is transported by the fluid downstream to increase the temperature Th2 of the hot contacts of the temperature measuring element 8 located downstream, which results in an increase in the output voltage $V2 = n \cdot a(Th2 - Tc)$. The flow amount of the fluid can be measured from a resultant change $\Delta V = V2 - V1$ in the output voltage. When the flow amount of the fluid is small, since the difference $\Delta T = Th2 - Th1$ between the temperatures of the temperature measuring elements 7 and 8 is proportionate to the mass flow of the fluid, the temperature difference can be obtained from Equation 3 shown below by measuring the output voltages V1 and V2 of the temperature measuring elements 7 and 8, and the mass flow of the fluid can be calculated by performing further calculation processes that are required.

$$\Delta T = \Delta V / (n \cdot a) \quad \text{Equation 3}$$
$$= (V2 - V1)/(n \cdot a)$$

The ambient temperature measuring resistive element 9 measures the ambient temperature of the flow sensor 1. The ambient temperature is measured with the ambient temperature measuring resistive element 9 to maintain the heating temperature of the heater 6 at a temperature which is higher than the ambient temperature by a constant value at any flow rate (this effect is hereinafter referred to as "constant temperature rise of the heater 6") and to correct temperature characteristics of the flow sensor 1.

In the flow sensor 1, when the heating temperature of the heater 6 increases, the output voltages of the temperature measuring elements 7 and 8 increase in proportionate to the same, which improves the resolution of a temperature measured by the temperature measuring elements 7 and 8. The higher the heating temperature of the heater 6, the greater the power consumption of the heater 6. Therefore, the heating temperature of the heater 6 is set by a user at an arbitrary constant temperature taking both factors into consideration.

However, the heating temperature of the heater 6 changes depending on the flow rate of a fluid. In an environment in which the flow sensor 1 is used, the ambient temperature normally changes. For those reasons, a change in the difference between the ambient temperature and the heating temperature of the heater 6 results in a change in a temperature gradient around the heater 6 and a change in the relationship between the output voltages of the temperature measuring elements 7 and 8 and the quantity or rate of the flow of a fluid, which deteriorates the accuracy of measurement.

Under such circumstances, a heater control circuit 14 as shown in FIG. 6 is used in the conventional flow sensor to automatically adjust the heating temperature of the heater 6 to a temperature which is higher than the ambient temperature detected by the ambient temperature measuring resistive element 9 by a constant value (a constant temperature rise of the heater). The heater control circuit 14 is comprised of fixed resistors 17 and 18, voltage-dividing resistors 19 and 20, an operational amplifier (differential amplifier circuit) 15, and a transistor 16. The fixed resistors 17 and 18 formed a bridge circuit in combination with the heater 6 and the ambient temperature measuring resistive element 9. A mid-point between the fixed resistor 17 and the ambient temperature measuring resistive element 9 is connected to an inverting input terminal of the operational amplifier 15, and a mid-point between the fixed resistor 18 and the heater 6 is connected to a non-inverting input terminal of the operational amplifier 15. The transistor 16 is inserted between a power supply Vcc and the fixed resistor 17, and series-connected voltage-dividing resistors 19 and 20 are connected between the base of the transistor 16 and the ground. The output of the operational amplifier 15 is connected to a mid-point between the voltage-dividing resistors 19 and 20.

The heater control circuit 14 is intended to keep the heater 6 in a thermal equilibrium state at a temperature which is higher than the ambient temperature by a constant value. When the temperature of the heater 6 decreases as a result of transition from the thermal equilibrium state e.g., a no-wind state to a state in which there is a flow of a gas, the potential at the non-inverting input terminal of the operational amplifier decreases to drive the transistor 16 which in turn supplies a current to restore the thermal equilibrium state, which operation occurs in a repetitive manner. A similar operation occurs when there is a change in the ambient temperature. Specifically, in the heater control circuit 14, when the heating temperature of the heater 6 increases beyond the temperature of the same in the equilibrium state, a voltage at the mid-point between the voltage-dividing resistors 19 and 20 increases because there is an increase in the current output by the operational amplifier 15. As a result, the base current of the transistor 16 decreases to decrease the current flowing through the bridge circuit. Consequently, the current flowing through the heater 6 decreases to reduce the heating temperature of the heater 6. When the heating temperature of the heater 6 conversely decreases below the temperature of the same in the equilibrium state, since the current output by the operational amplifier 15 decreases, the voltage at the mid-point between the voltage-dividing resistors 19 and 20 decreases. This results in an increase in the base current of the transistor 16 and in an increase in the current flowing through the bridge circuit too. Consequently, the current flowing through the heater 6 increases to increase the heating temperature of the heater 6.

When the temperature of the ambient temperature measuring resistive element 9 for detecting the ambient temperature increases beyond the temperature in the equilibrium state, since the current output by the operational amplifier 15 decreases, the voltage at the mid-point between the voltage-dividing resistors 19 and 20 decreases. This results in an increase in the base current of the transistor 16 and an increase in the current flowing through the bridge circuit. This increases the current flowing through the heater 6 to increase the heating temperature of the heater 6. When the heating temperature of the ambient temperature measuring resistive element 9 conversely decreases below the temperature in the equilibrium state, since there is an increase in the current output by the operational amplifier 15, the voltage at the mid-point between the voltage-dividing resistors 19 and 20 increases. As a result, the base current of the transistor 16 decreases, which in turn decreases the current flowing through the bridge circuit. Consequently, the current flowing through the heater 6 decreases to reduce the heating temperature of the heater 6.

As thus described, the heater control circuit 14 operates to keep the resistance of the heater 6 constant and automatically adjusts the heating temperature of the heater 6 to a constant value.

The resistance of the ambient temperature measuring resistive element 9 is input to a temperature correction circuit including a CPU and having a calculating function, and the difference $\Delta V=V2-V1$ between the output voltages of the temperature measuring elements 7 and 8 are corrected based on a change in the ambient temperature detected by the ambient temperature measuring resistive element 9 to correct temperature characteristics. Therefore, a separate temperature correction circuit has been required for the conventional flow sensor in order to make a correction in accordance with the ambient temperature.

SUMMARY OF INVENTION

It is an object of the invention to improve temperature characteristics (dependence on ambient temperature) of a flow sensor and to eliminate any need for a temperature correction circuit which has been required in the prior art.

A flow sensor according to the invention is a flow sensor comprising a substrate, an insulation layer formed as a thin film on a surface of the substrate, a heating element provided on a surface of the insulation layer, at least one temperature measuring element provided on at least one side of the heating element on the surface of the insulation layer, and a gap formed at the semiconductor substrate under at least parts of the heating element and temperature measuring element, characterized in that the temperature measuring element has ambient temperature dependence which cancels ambient temperature dependence attributable to factors other than the temperature measuring element. The term "ambient temperature dependence" in this context means a change in the output of a flow sensor attributable to a change in the ambient temperature of the flow sensor.

Since the temperature measuring element of the flow sensor according to the invention has ambient temperature dependence which cancels ambient temperature dependence attributable to factors other than the temperature measuring element, the flow sensor has a whole has small ambient temperature dependence which is a combination of the ambient temperature dependence of the temperature measuring element and the ambient temperature dependence attributable to factors other than the temperature measuring element. This eliminates any need for a temperature correction circuit for correcting ambient temperature dependence unlike the prior art.

In a mode for carrying out the invention intended for cancellation of ambient temperature dependence of a flow sensor between a temperature measuring element and factors other than the temperature measuring element, the temperature measuring element may be constituted by a thermopile, and a configuration may used in which the gap is provided under a hot contact to keep ambient temperature dependence of the temperature measuring element at a constant ratio to ambient temperature dependence attributable to factors other than the temperature measuring element. By keeping the ambient temperature measuring element at a constant ratio to the ambient temperature dependence attributable to factors other than the temperature measuring element, the ambient temperature dependence can be easily canceled within the temperature range of the same. Especially, in a configuration in which ambient temperature dependence of a thermopile serving as a temperature measuring element has an absolute value of ambient temperature dependence substantially equal to that of ambient temperature dependence attributable to factors other than the thermopile, ambient temperature dependence of a flow sensor can be suppressed with high accuracy.

In another mode for carrying out a flow sensor according to the invention, the temperature measuring element is constituted by a thermopile; the gap is provided under a hot contact; at least a part of a material that makes up the thermopile is doped with a dopant, which provides the thermopile with ambient temperature dependence that cancels ambient temperature dependence attributable to factors other than the thermopile. Since a change in the dose for the doping of the thermopile results in a change in the ambient temperature dependence of the thermopile, the dose may be adjusted in consideration to the ambient temperature dependence attributable to factors other than the thermopile to cancel the ambient temperature dependence attributable to factors other than the thermopile with the ambient temperature dependence of the thermopile.

In still another mode for carrying out a flow sensor according to the invention, the temperature measuring elements are provided on both sides of the heating element and spaced by the same, and the gap opens on a surface of the semiconductor substrate in a region between the temperature measuring elements. When the temperature measuring elements are thus provided on both sides of the heating element, the temperature of the temperature measuring element located upstream of a flow of a fluid decreases, and the temperature of the temperature measuring element located downstream increases. As a result, the sensitivity of the flow sensor can be improved by obtaining the difference between the temperatures of the two temperature measuring elements.

In still another mode for carrying out a flow sensor according to the invention, the thermopile is made of polysilicon and aluminum; phosphorus (P) is used as the dopant for controlling the ambient temperature dependence of the thermopile; and the dose for the dopant is in a range from $1.0 \times 10^{17}$ to $1.0 \times 10^{21}$ ions/cm$^3$. An error of a temperature detected by the temperature measuring element can be kept in a range of ±0.1%/° C. by keeping the dose of phosphorus within the range, which makes it possible to satisfy general specifications for temperature characteristics required for a flow sensor.

A method of manufacturing a flow sensor according to the invention is a method of manufacturing a flow sensor having a semiconductor substrate, an insulation layer formed as a thin film on a surface of the semiconductor substrate, a heating element provided on a surface of the insulation layer, thermopiles provided on both sides of the heating element and spaced by the same on a surface of the insulation layer, and a gap formed at the semiconductor substrate under regions of the thermopiles extending bonding portions at ends thereof and to the heating element, characterized in that a semiconductor material such as polysilicon is used as at least a part of the material serving as the thermopiles and in that ambient temperature dependence of the thermopiles is kept at a constant ratio to ambient temperature dependence attributable to factors other than the thermopiles by controlling the dose of an impurity with which the semiconductor material is doped.

In the method of manufacturing a flow sensor according to the invention, the ambient temperature dependence of the thermopiles is kept at a constant ratio to the ambient temperature dependence attributable to factors other than the thermopiles by controlling the dose of an impurity with which the semiconductor material for the thermopiles is doped, the flow sensor as a whole has small ambient temperature dependence which is a combination of the ambient temperature dependence of the thermopiles and the ambient temperature dependence attributable to factors other than the thermopiles. This eliminates any need for a temperature correction circuit for correcting ambient temperature dependence unlike the prior art. It is also possible to cancel ambient temperature dependence of the flow sensor as a whole easily by controlling the dose. Further, since the thermopiles are provided on both sides of the heating element, the temperature of the thermopile located upstream of a flow of a fluid decreases, and the temperature of the thermopile located downstream increases. Therefore, the sensitivity of the flow sensor can be improved by obtaining the difference between the temperatures of the tow thermopiles.

The above-described constituent elements of the invention may be used in any possible combination.

DETAILED DESCRIPTION

First Embodiment

Figure 7:
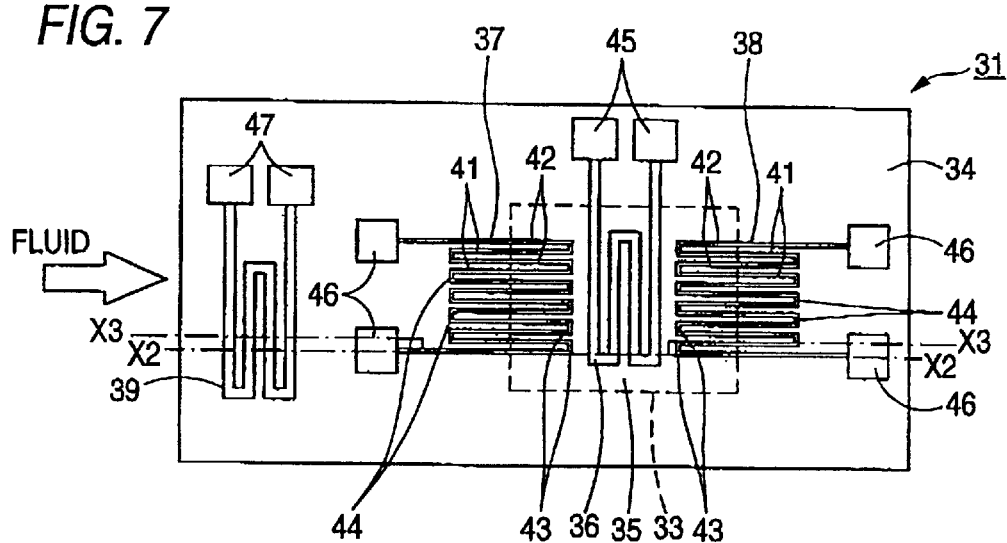
FIG. 7 is a plan view of a structure of a flow sensor according to an embodiment of the invention.
Figure 8:
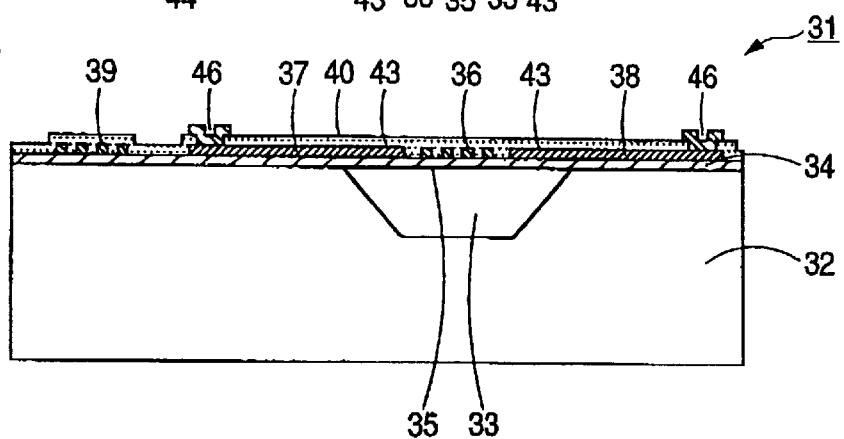
FIG. 8 is a sectional view taken along the line X2—X2 in FIG. 7.

FIGS. 7 and 8 show a structure of a flow sensor 31 according to an embodiment of the invention. FIG. 8 shows a sectional view taken along the line X2—X2 in FIG. 7, and FIG. 7 shows a plan view in which a protective film 40 and so on are omitted to expose thermopiles 37 and 38. In the flow sensor 31, a gap 33 in the form of a recess which is wider in the upper part thereof is formed on an upper surface of a silicon substrate 32. An insulation thin film 34 made of $SiO_2$ or the like is provided on an upper surface of the silicon substrate 32 such that it covers the gap 33, and a bridge section 35 in the form of a thin film is formed by a part of the insulation thin film 34 such that it is supported in a space above the gap 33. The bridge section 35 is thermally insulated from the silicon substrate 32 by the gap 33. A heater 36 made of polysilicon is provided in the middle of a surface of the bridge section 35, and thermopiles 37 and 38 as temperature measuring elements are provided on both sides of the heater 36 in respective positions in a symmetrical relationship downstream and upstream of the heater 36. An ambient temperature measuring resistive element 39, made of polysilicon, for detecting ambient temperature is provided on the insulation thin film 34 outside the bridge section 35, and the silicon substrate 32 is coated with a protective film 40 such that the heater 36, thermopiles 37 and 38, and ambient temperature measuring resistive element 39 are covered.

The thermopiles 37 and 38 are constituted by thermocouples made of polysilicon and aluminum. First thin wires 41 made of polysilicon and second thin wires 42 made of aluminum are alternately provided in parallel with each other such that they cross edges of the insulation thin film 34. A group of hot contacts 43 are constituted by connecting points between the first thin wires 41 and second thin wires 42 in the bridge section 35, and a group of cool contacts 44 are constituted by connecting points between the first thin wires 41 and second thin wires 42 outside the bridge section 35. The heater 36 and first thin wires 41 made of polysilicon are doped with phosphorus (P) in a dose of $1.0 \times 10^{19}$ ions/cm$^3$.

While the temperature of the cool contacts 44 is unlikely to change even when it is put in contact with a gas because they are located on the silicon substrate 32 serving as a heat sink, the hot contacts 43 sensitively undergo a temperature change when put in contact with a gas because of their small thermal capacity, attributable to the fact that they are formed on the bridge section 35 which is floated above the silicon substrate 32.

Voltages V output by the thermopiles 37 and 38 (voltages across the same) of the flow sensor 31 are expressed by Equation 4, where n represents the quantities of the hot contacts 43 and cool contacts 44 of the thermopiles 37 and 38 respectively; Th represents the temperature of the hot contacts 43; and Tc represents the temperature of the cool contacts 44.

$$V1 = n \cdot a(Th - Tc) \qquad \text{Equation 4}$$

where "a" represents a Seebeck coefficient.

Reference numbers 45, 46, and 47 represent wire pads for wire-bonding the heater 36, thermopiles 37 and 38, and ambient temperature measuring resistive element 39, respectively.

In the flow sensor 31, the outputs of the thermopiles 37 and 38 located upstream and downstream of the heater 36 are also monitored with the heater 36 heated by applying a current thereto. The voltages output by the thermopiles 37 and 38 are equal to each other when no gas flows or when there is no wind. The hot contacts 43 of the thermopiles 37 located upstream are cooled to a lower temperature when a gas moves from the upstream toward the downstream in the direction indicated by the arrow in FIG. 7, and the output voltage decreases accordingly. Meanwhile, the temperature of the hot contacts 43 of the thermopile 38 located downstream is increased by the heat transported by the gas to increase the output voltage of the same. It is therefore possible to measure the quantity of the flow of the air from the difference between the output voltages of the thermopiles 37 and 38. In a structure in which the thermopiles 37 and 38 are provided on both sides of the heater 36 as in the present embodiment, the flow rate of a fluid (the flow rate of a gas) can be detected even when the gas flows in the direction opposite to the direction indicated by the arrow. When the thermopiles 37 and 38 are provided on both sides of the heater 36, since the temperature of the thermopile located upstream of the flow of a fluid decreases and the temperature of the thermopile located downstream increases, the sensitivity of the flow sensor 31 can be improved by obtaining the difference between the temperatures of the thermopiles 37 and 38.

The ambient temperature measuring resistive element 39 is used to measure the ambient temperature and to maintain the heating temperature of the heater 36 at a temperature higher than the ambient temperature by a constant value.

A process for manufacturing the above-described flow sensor 31 will now be described with reference to FIGS. 9A, 9B, 9C, 10D, 10E, 10F, 10G, 11H, 11I, and 11J. Any of the drawings that explain the manufacturing process shows a sectional view taken along the line X3—X3 in FIG. 7. The manufacturing process will be described with reference to the drawings.

Figure 9:
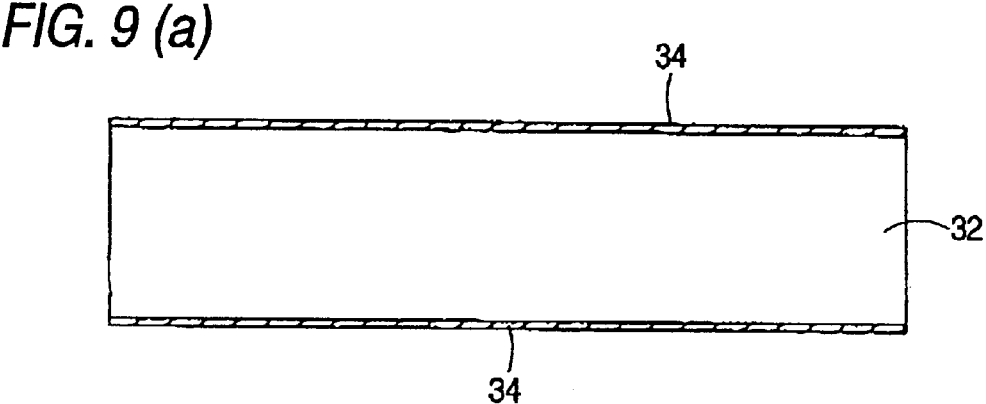
FIGS. 9A, 9B, and 9C are sectional views showing a process of manufacturing the above flow sensor, any of the figures showing a sectional view taken along the line X3—X3 in FIG. 7.
Figure 9:
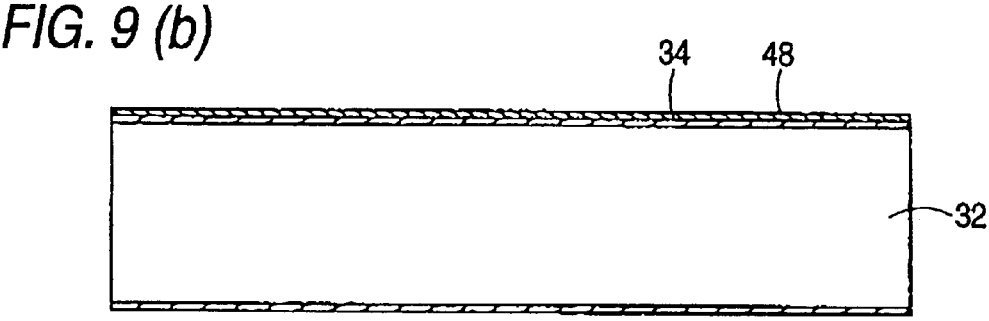
Figure 9:
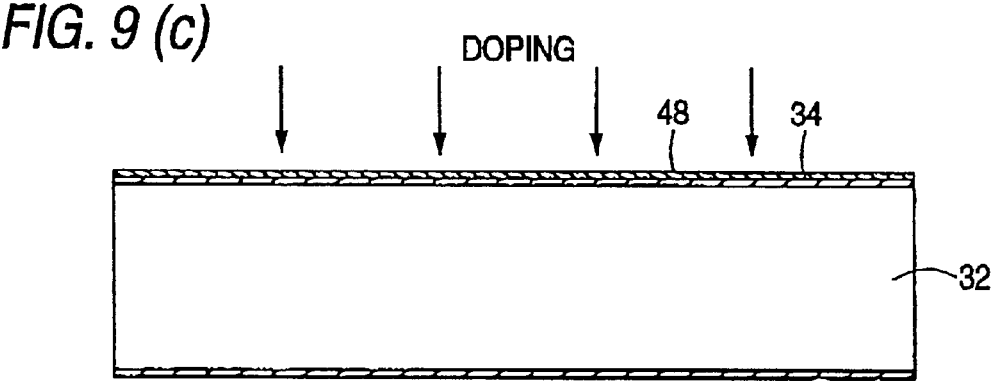

First, an insulation thin film 34 made of, for example, $SiO_2$ is formed on both of top and bottom surfaces of a silicon substrate 32 through thermal oxidation or the like (FIG. 9A), and polysilicon is deposited on the insulation thin film 34 on the top surface to a thickness of 500 nm using CVD or the like to form a polysilicon film 48 (FIG. 9B). Next, the entire polysilicon film 48 is doped with phosphorus (P) as impurity atoms in a dose of $1 \times 10^{19}$ ions/cm$^3$ using ion implantation or the like (FIG. 9C).

Figure 10:
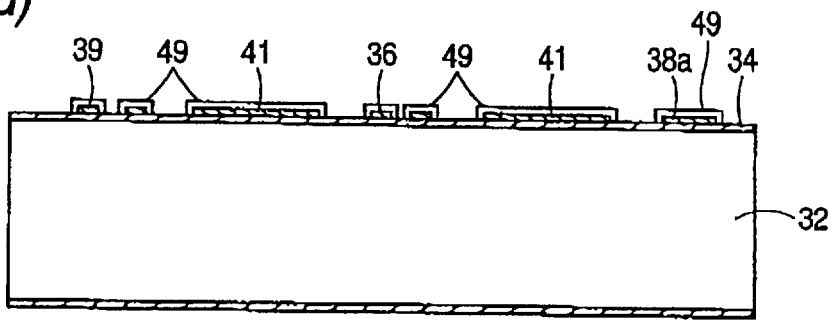
FIGS. 10D, 10E, 10F, and 10G are continuations of FIGS. 9A, 9B, and 9C.
Figure 10:
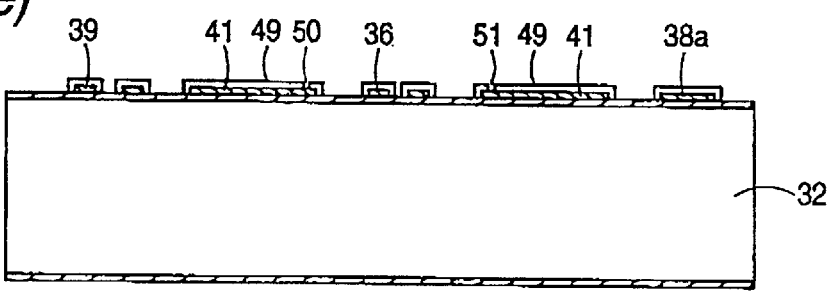
Figure 10:
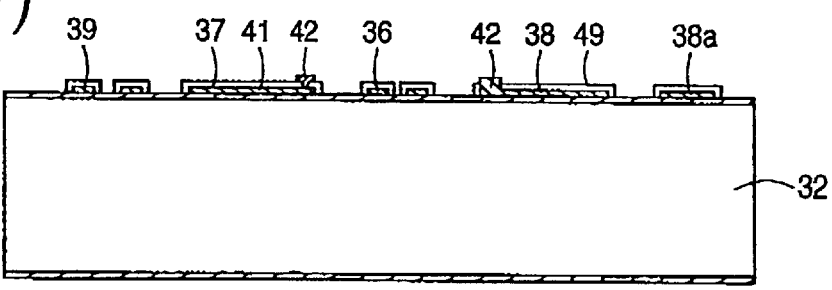
Figure 10:
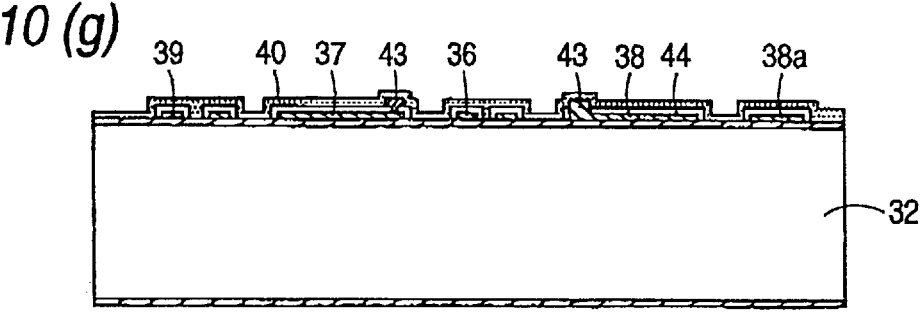

Thereafter, the polysilicon film 48 is etched using photolithography, and patterns of a heater 36, an ambient temperature measuring resistive element 39 for measuring ambient temperature, and first thin wires 41 of each of thermopiles 37 and 38 are formed from the polysilicon film 48 (FIG. 10D). Reference number 38a represents a pad section formed at an end of a first thin line 41 of the thermopile 38. Then, the impurity in the patterned polysilicon film 48 is thermally diffused. At this time, an oxide film 49 is formed on the surface of the polysilicon film 48.

Next, parts of the oxide film 49 covering the first thin wires 41 are etched to form openings 50 and 51 in regions of the thermopiles 37 and 38 to serve as hot contacts 43 and cool contacts 44 (FIG. 10E); aluminum is deposited on the oxide film 49 using sputtering or the like; and the aluminum film is patterned using photolithography to form second thin wires 42 of the thermopiles 37 and 38 (FIG. 10F). At this time, ends of the second thin wires 42 are connected to the ends of the respective first thin wires 41 through the openings 50 and 51 of the oxide film 49, and the thermopiles 37 and 38 are formed by the first thin wires 41 and second thin wires 42 formed under the oxide film 49.

For example, $SiO_2$ is thereafter deposited on the entire region of the substrate using CVD or the like to form a protective film 40 for protecting the wiring (FIG. 10G).

Figure 11:
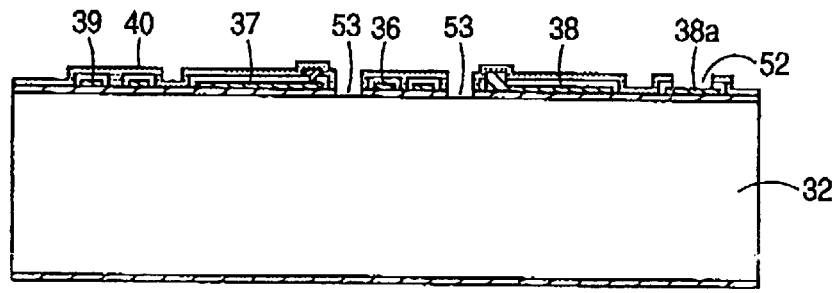
FIGS. 11H, 11I, and 11J are continuations of FIGS. 10D, 10E, 10F, and 10G.
Figure 11:
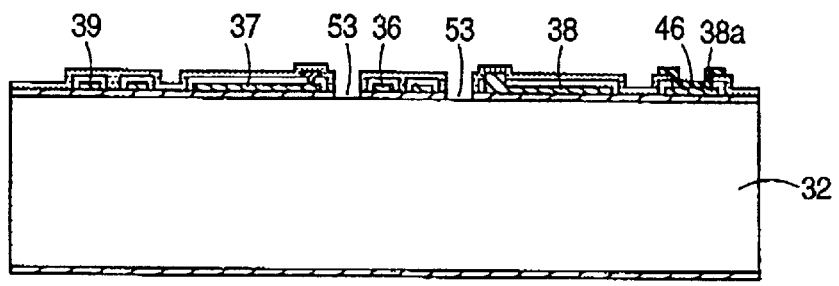
Figure 11:
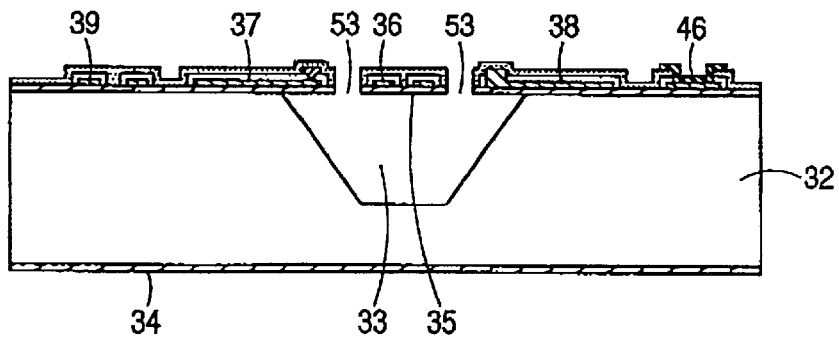

The protective film 40 and oxide film 49 are partially etched at both ends of the thermopiles 37 and 38, the heater 36 and ambient temperature measuring resistive element 39 to provide openings 52, and etching holes 53 are simultaneously formed to expose a part of the silicon substrate 32 at the hot contacts 43 (FIG. 11H). A metal material is then deposited at both ends of the thermopiles 37 and 38, heater 36, and ambient temperature measuring resistive element 39 to provide respective wire pads 45, 46, and 47 (FIG. 11I).

Next, the top surface of the silicon substrate 32 is etched from the etching holes 53 to provide a gap 33 on the top surface of the silicon substrate 32, and a bridge section 35 is formed by the insulation thin film 34 (FIG. 11J).

While a manufacturing process has been described above in which the gap 33 and bridge section 35 are formed by etching the top surface of the silicon substrate 32 from the etching holes 53, the bridge section 35 is not limited to such a method of formation, and it may be formed using any other method as long as it thermally insulates the heater 36 and the hot contacts 43 of the thermopile 37 and 38 from the silicon substrate 32. For example, the silicon substrate 32 may be etched from the bottom surface thereof to form a bridge including the heater 36 and the hot contacts 43 of the thermopiles 37 and 38.

While there are various factors that can cause fluctuations of temperature characteristics of a flow sensor, three major factors can be listed as shown below.
(1) The coefficient of thermal conductivity of the fluid to be measured
(2) power consumption of the heater
(3) temperature characteristics of the temperature measuring element Each of the factors will now be discussed in detail.

Figure 1:
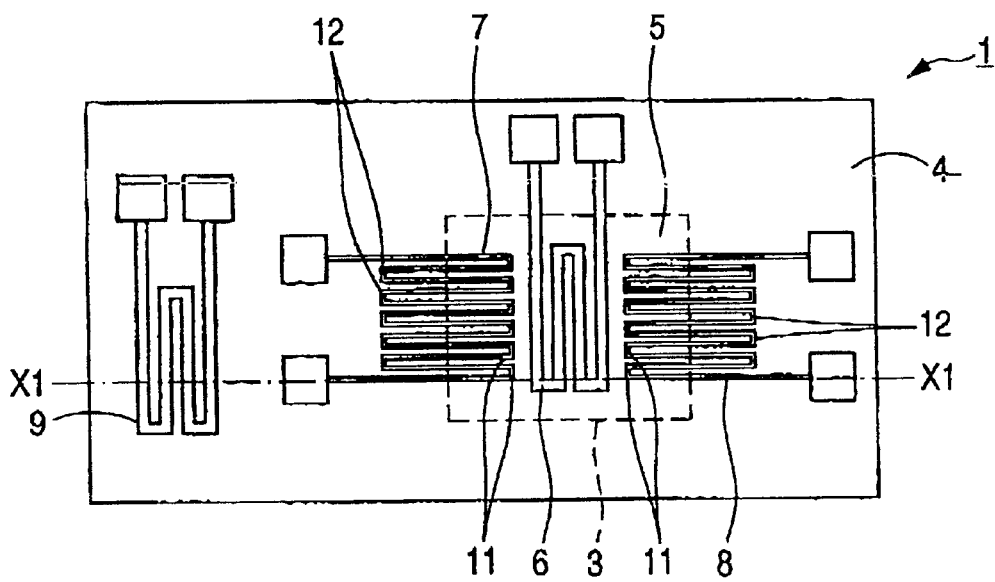
FIG. 1 is a plan view of a structure of a conventional flow sensor.
Figure 2:
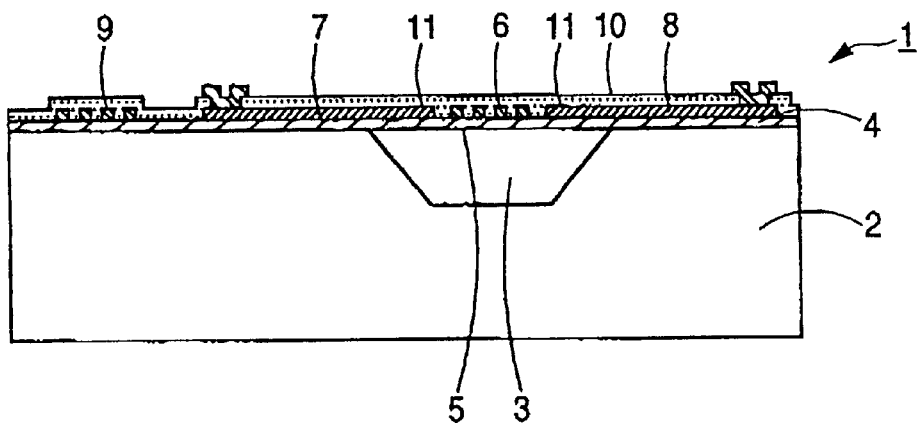
FIG. 2 is a sectional view taken along the line X1—X1 in FIG. 1.
Figure 3:
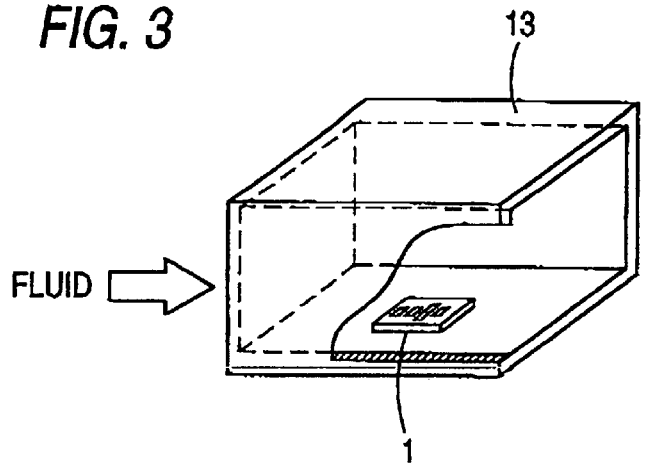
FIG. 3 is a partially cutaway perspective view of a flow sensor provided in a channel.
Figure 4:
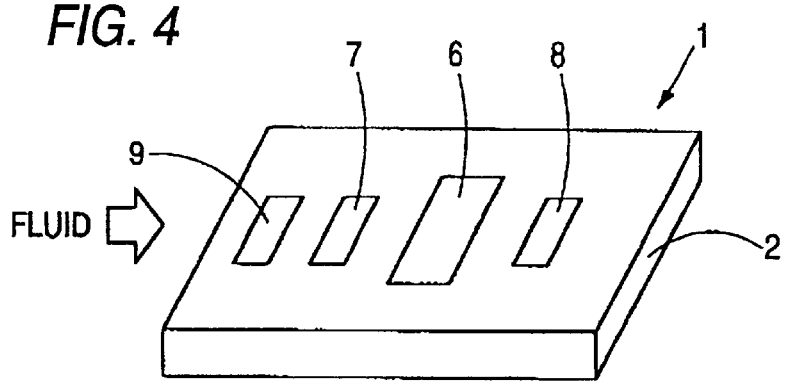
FIG. 4 is an illustration showing the direction of a flow of a fluid through the flow sensor.
Figure 5:
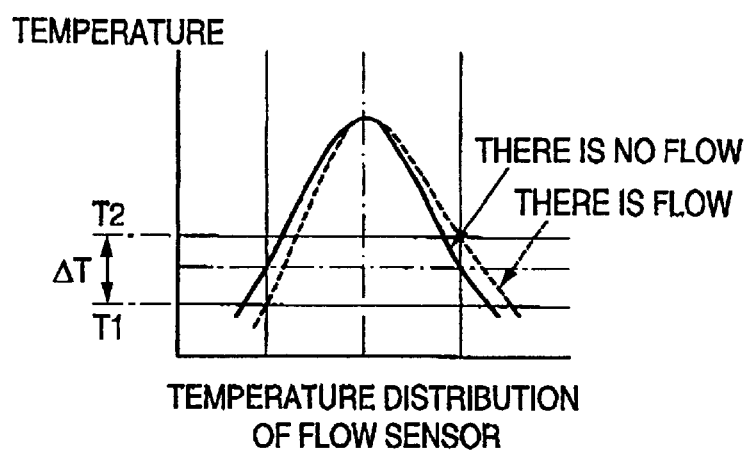
FIG. 5 shows temperature distribution curves taken when there is no flow of the fluid (there is no wind) and when there is a low of the fluid (there is a wind).

First, a relationship between the coefficient of thermal conductivity of a fluid to be measured and temperature characteristics will be described. As already described with reference to FIG. 5, a flow sensor has different temperature distributions on a surface thereof in a windy state in which a fluid flows than in a no-wind state in which no fluid flows (or depending on a flow rate). However, fluids having different coefficients of thermal conductivity also result in different temperature distributions on the surface of the flow sensor even if the fluids have the same flow rate.

Figure 12:
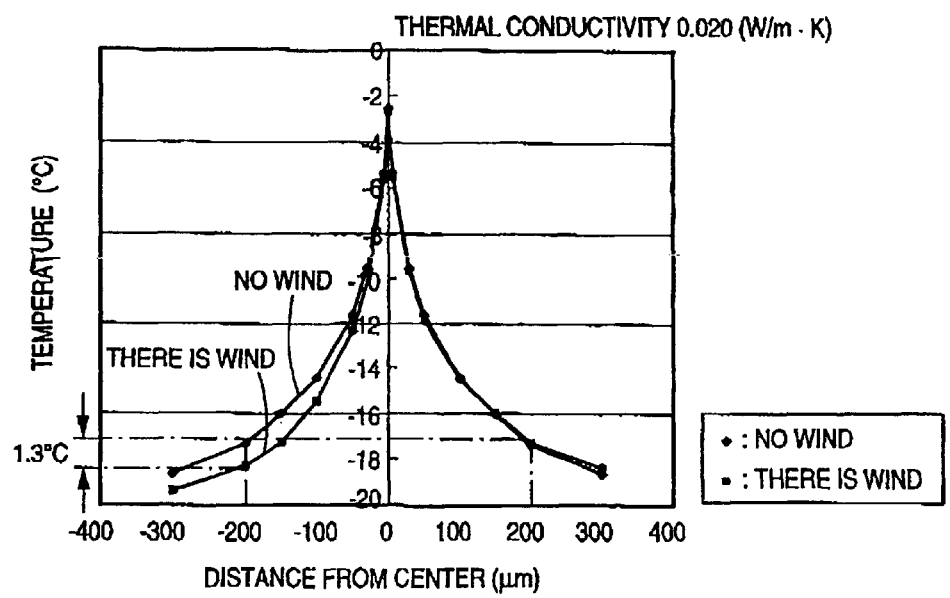
FIG. 12 shows temperature distribution curves of a flow sensor in contact with a fluid having a coefficient of thermal conductivity of 0.020 W/m·K taken when there is no wind and when there is a wind.
Figure 13:
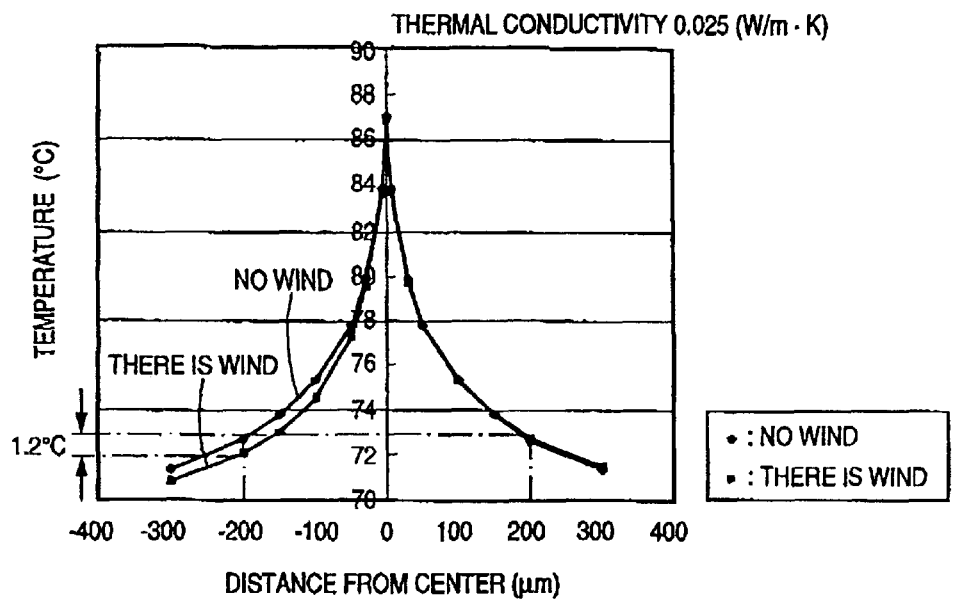
FIG. 13 shows temperature distribution curves of a flow sensor in contact with a fluid having a coefficient of thermal conductivity of 0.025 W/m·K taken when there is no wind and when there is a wind.

FIG. 12 shows temperature distribution curves obtained through a simulation when a flow sensor is in an atmosphere in which it is veiled in a gas having a coefficient of thermal conductivity of 0.020 W/(m·K), and FIG. 13 shows temperature distribution curves obtained through a simulation when the flow sensor is in an atmosphere in which it is veiled in a gas having a coefficient of thermal conductivity of 0.025 W/(m·K). Both of FIGS. 12 and 13 show temperature distribution curves in a no-wind state in which there the fluid does not move and in a windy state in which the fluid flows at a constant flow rate, and the respective abscissa axes represent distances measured from the center of the heater. In either of the simulations, the heater temperature was a temperature which is 20° C. higher than the ambient temperature, and the flow rate of the fluid was 30 cm/sec. As apparent from the results of the simulations, fluids having different coefficients of thermal conductivity result in different temperature distribution curves.

Figure 14:
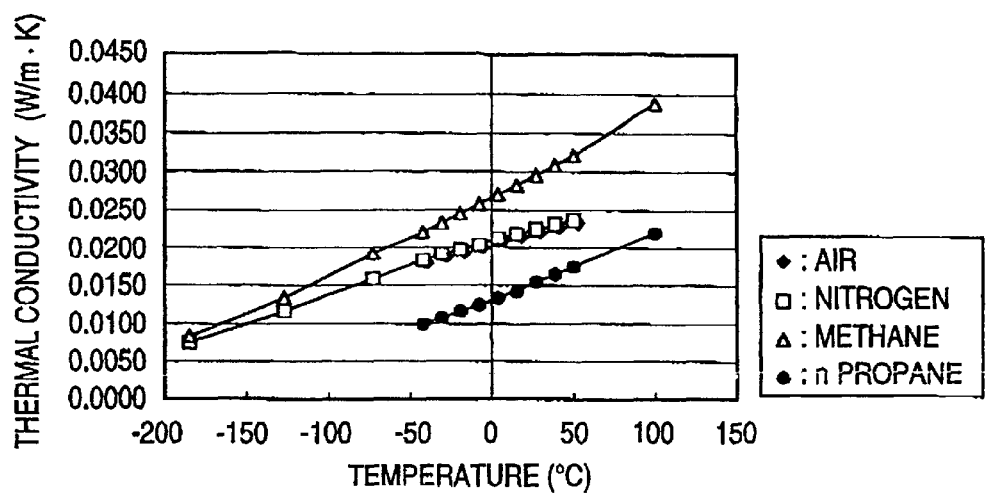
FIG. 14 shows changes in the coefficients of thermal conductivity of air and other gases depending on temperatures.

The coefficient of thermal conductivity of a fluid varies depending on the temperature as shown in FIG. 14 and, for example, the coefficient of thermal conductivity changes from 0.020 W/(m·K) to 0.025 W/(m·K) when the temperature of air changes from −20° C. to 70° C. Let us assume that temperature measuring elements are provided in positions on both sides of a heater of a flow sensor, each position being 200 $\mu$m apart from the center of the heater. Then, a temperature difference of 1.3° C. is measured from FIG. 12 when air having a coefficient of thermal conductivity of 0.020 W/(m·K) flows, and a temperature difference of 1.2° C. is measured from FIG. 13 when air having a coefficient of thermal conductivity of 0.025 W/(m·K) flows. Therefore, a measurement error of about 8% occurs in a result of measurement by the flow sensor when the temperature of air changes from −20° C. to 70° C. Further, since the temperature dependence of the coefficient of thermal conductivity of a gas depends on the type of the gas as shown in FIG. 14, temperature characteristics originating from a coefficient of thermal conductivity depend on the type of the fluid.

Figure 6:
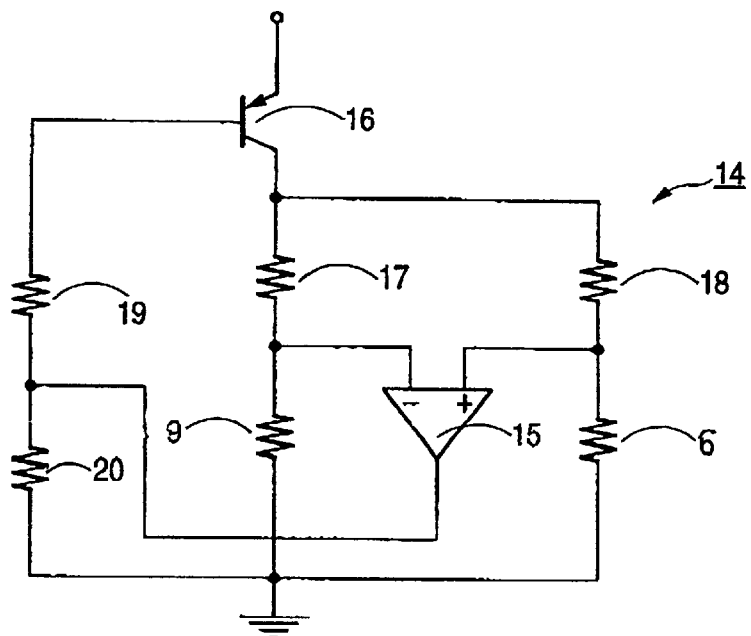
FIG. 6 is a circuit diagram of a heater control circuit used in a conventional flow sensor.
Figure 15:
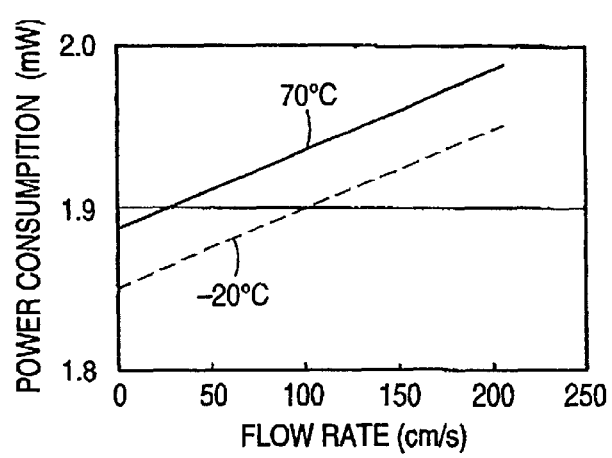
FIG. 15 shows a relationship between the flow rate of a fluid and power consumption of a heater.

A relationship between the power consumption of a heater and temperature characteristics will now be described. The power consumption or a temperature rise of a heater control circuit as shown in FIG. 6 changes depending on the ambient temperature. Results of an experiment have revealed that power consumption characteristics as shown in FIG. 15 are obtained when the ambient temperature is changed from −20° C. to 70° C. for example in the air with the heater kept at a temperature which is 20° C. higher than the ambient temperature. FIG. 15 indicates that an error of about +2% occurs at any flow rate. Since power consumption is proportionate to a temperature rise at the heater, an error of about +2% occurs in the temperature rise when the ambient temperature changes from −20° C. to 70° C. Since a temperature rise is proportionate to the output of a temperature sensor, an error of about 2% occurs under the above-described conditions.

Temperature characteristics of temperature measuring elements will now be described. When resistance wires are used as temperature measuring elements, a relationship between the resistance and the temperature of the same is linearly approximated to calculate the temperature from the resistance. When the relationship between the resistance and temperature deviates from linearity, the deviation can directly result in temperature characteristics. However, most metals can be regarded as having substantially linear resistance-temperature characteristics. For example, platinum used in general purpose temperature sensors has a temperature error of only 0.1% even when there is a temperature change of 100° C. Therefore, there is no concern about temperature characteristics when resistance wires are used as temperature measuring elements.

When thermopiles are used as temperature measuring elements, however, since the Seebeck coefficient a has temperature characteristics, an error will occur in ΔT in Equations 1, 2, and so on, which means that they have temperature characteristics when used as a temperature sensor. The temperature dependence of the Seebeck coefficient a depends on the material used for the thermopiles and the dose used for doping them. When polysilicon is used as the material of the thermopiles, the output will vary in a range of about ± several tens of percent depending on the dose when the ambient temperature changes from −20° C. to 70° C. as seen in the cases of evaluation of temperature characteristics attributable to the coefficient of thermal conductivity of a fluid and temperature characteristics attributable to heater power consumption.

A thermal flow sensor has temperature characteristics attributable to factors other than those described above, including the thermal expansion of the package. However, since the configuration of temperature measuring elements can be arbitrarily selected by the designer of the flow sensor, temperature characteristics attributable to the temperature measuring elements can be arbitrarily adjusted by the designer of the flow sensor. In particular, when thermopiles are used as temperature measuring elements, temperature characteristics of the Seebeck coefficient can be adjusted only by adjusting the dose for doping them. Therefore, the temperature characteristics of the above-described flow sensor according to the invention as a whole are reduced by canceling temperature characteristics attributable to the coefficient of thermal conductivity of a fluid to be measured and temperature characteristics attributable to the power consumption of the heater with temperature characteristics of the temperature measuring elements.

Figure 16:
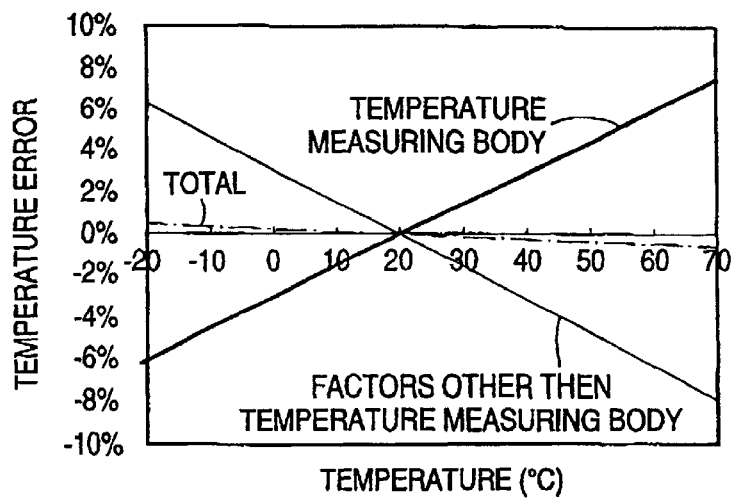
FIG. 16 shows temperature characteristics attributable to temperature measuring elements (thermopiles) and factors other than the temperature measuring elements and total temperature characteristics that are a combination of such temperature characteristics.

FIG. 16 shows results of measurement of temperature characteristics of the thermopiles (temperature measuring elements) of the flow sensor in the above-described embodiment with the first thin wires of the thermopiles made of polysilicon doped with phosphorus in a dose of $1.0 \times 10^{19}$ ions/cm$^3$, the measurement results being plotted relative to a reference of 20° C. Air is used as a fluid to be measured. FIG. 16 also shows temperature characteristics of the flow sensor attributable to factors other than the thermopiles (temperature measuring elements). In the case shown in FIG. 16, the temperature characteristics attributable the thermopiles and factors other than the thermopiles have equal absolute values and opposite slopes in a wide temperature range. It is therefore possible to substantially cancel total temperature characteristics that are a combination of the temperature characteristics attributable to the thermopiles and the temperature characteristics attributable to factors other than the thermopiles.

Figure 17:
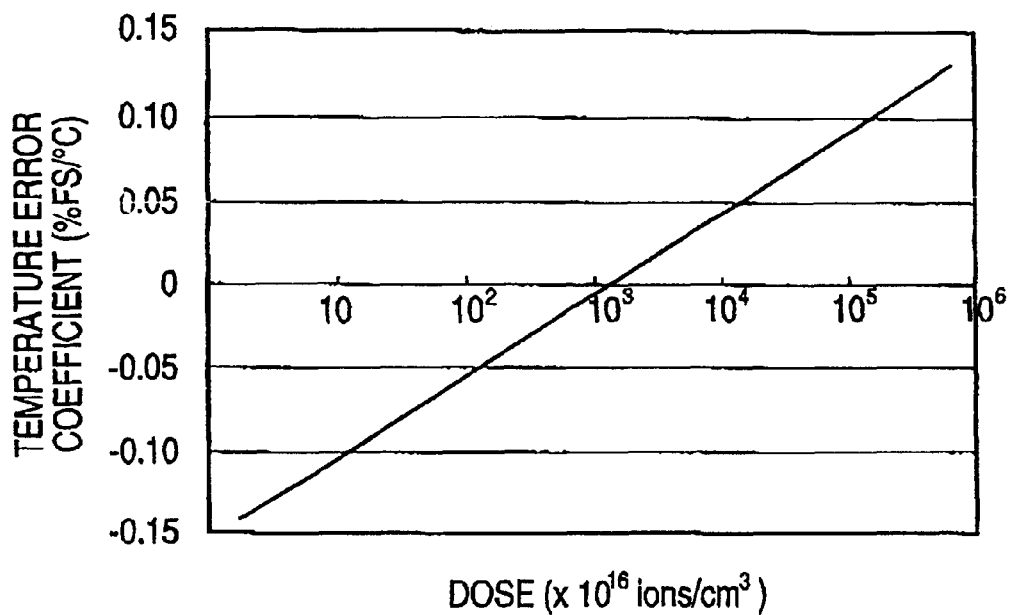
FIG. 17 shows a relationship between doses of a dopant for doping thermopiles and temperature error coefficients.

FIG. 17 is a graph showing a temperature error coefficient of the flow sensor as a whole (which is equivalent to the slope of the total temperature characteristic curve shown in FIG. 16), the dose of phosphorus in the first thin wires made of polysilicon serving as a parameter. Most common flow sensors are required to satisfy temperature characteristics specifications within a range of ±0.1% FS/° C. relative to the full scale (FS), and FIG. 17 indicates that the dose of phosphorus may be within a range from $1.0 \times 10^{17}$ to $1.0 \times 10^{21}$ ions/cm$^3$ in such a case.

However, since temperature characteristics of a flow sensor attributable to factors other than thermopiles change depending on various conditions such as the coefficient of thermal conductivity of a fluid and the resistance of the heater, the dose for the doping the thermopiles must be adjusted in accordance with such conditions.

As thus described, according to the present invention, total temperature characteristics of a flow sensor can be substantially cancelled by calculating temperature characteristics attributable to factors other than thermopiles taking the structure of the flow sensor and the purpose and environment of use of the same into consideration and by determining the dose for the doping of polysilicon such that the same temperature characteristics will cancel temperature characteristics attributable to the thermopiles. In a flow sensor according to the invention, it is therefore possible to eliminate a need for a temperature correction circuit which has been required in the prior art to correct temperature characteristics, which makes it possible to reduce the cost of the flow sensor significantly. For example, a circuit as shown in FIG. 18 can be used as an output circuit of a flow sensor, which eliminates a need for a special circuit for adjusting temperature characteristics.

Figure 18:
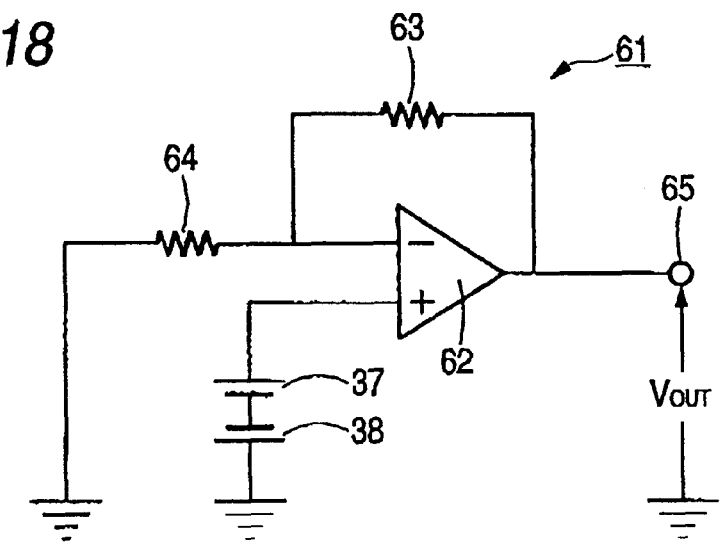
FIG. 18 is a circuit diagram showing a configuration of an output circuit used in a flow sensor according to the invention.

In an output circuit 61 shown in FIG. 18, a negative feedback amplifier circuit is formed by connecting a negative feedback resistor 63 between an output terminal 65 and a inverting input terminal of a differential amplifier circuit 62 and connecting an inverting input terminal of the same to the ground through a fixed resistor 64. Two thermopiles 37 and 38 are inserted in series between the non-inverting input terminal of the differential amplifier circuit 62 and the ground such that they produce electromotive forces in opposite directions. The output circuit 61 is completely independent of a heater control circuit, and it arbitrarily amplifies a difference between the electromotive forces of the upstream and downstream thermopiles in the feedback amplifier circuit when there is a wind and performs a calculation process on an amplification signal Vout output from the output terminal 65 as needed to obtain mass flow rate of the fluid.

While the above embodiment has referred to a structure in which thermopiles are provided on both sides of a heater, a flow sensor according to the invention may have a structure in which a thermopile is provided only one side of a heater.

Figure 19:
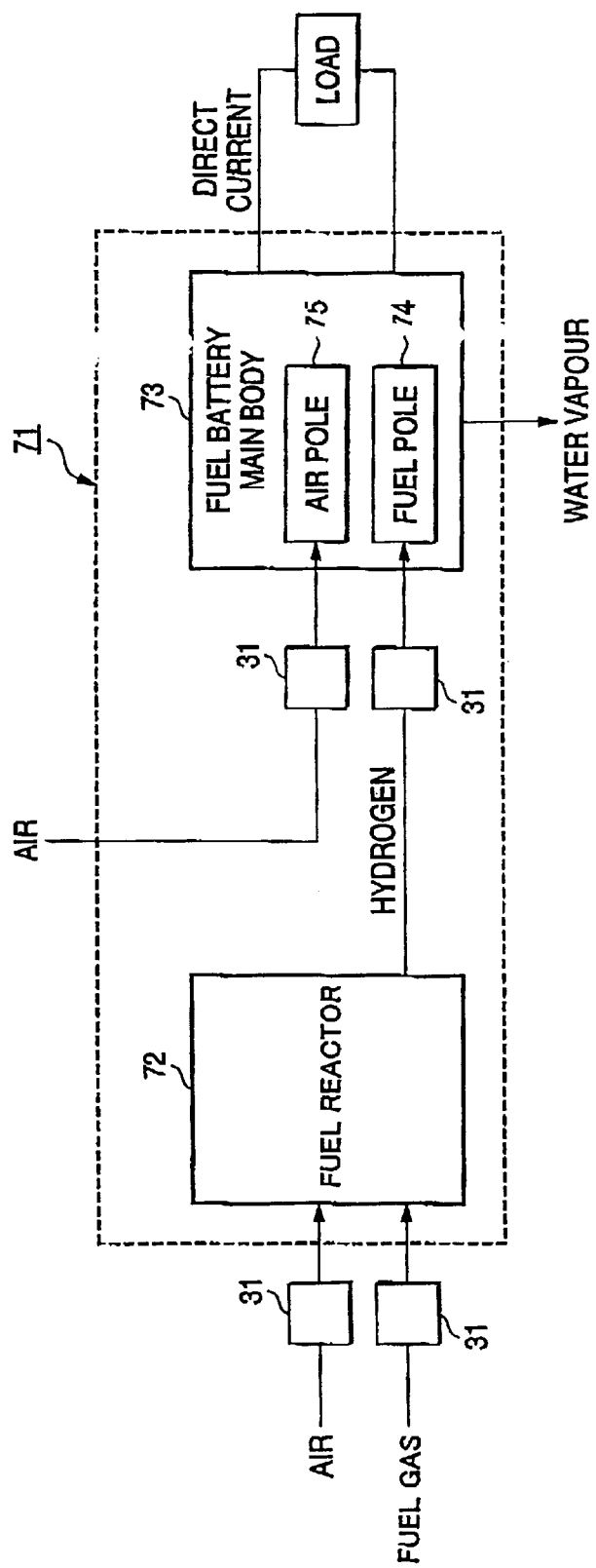
FIG. 19 shows a configuration of a fuel cell system utilizing a flow sensor according to the invention.

FIG. 19 shows a schematic drawing of a fuel battery 71 using a flow sensor of the present invention. Fuel battery 71 utilizes electricity that is generated by reacting hydrogen with oxygen to produce water. The fuel battery 71 includes fuel reactor 72 and fuel battery main body 73.

Fuel reactor 72 is an apparatus for producing hydrogen which is supplied to the fuel battery main body 73. The flow sensors 31 of the present invention are provided inside the pipes for supplying city gas and air to the fuel reactor 72. The sensors 31 are used to maintain the mix-ratio of the city gas and air inside fuel reactor 72.

Also, the flow sensors 31 of the present invention are disposed inside the pipes that are provided for supplying hydrogen and air (oxygen) into a fuel pole 74 and air pole 75 of the fuel battery main body 73 respectively. By measuring the amount of flow of hydrogen and oxygen supplied to the fuel battery main body 73, the reaction is controlled to smoothly proceed and generation efficiency of electric power is enhanced.

Owing to the use of conventional wire-type flow sensors, fuel batteries have been expensive and large in size. However, by using a flow sensor of the present invention, a less expensive and smaller size fuel battery 71 can be achieved.

FIG. 19 is a schematic view of a fuel cell system 71 utilizing a flow sensor according to the invention. A fuel cell provides electricity that is generated during a reaction between hydrogen and oxygen to produce water. The fuel cell system 71 is generally comprised of a fuel reactor 72 and a fuel cell main body 73.

The fuel reactor 72 is a device for generating hydrogen to be supplied to the fuel cell main body 73, and a flow sensor 31 according to the invention is used in each of pipes for supplying a fuel gas and air to the fuel reactor 72. The purpose is to measure the flow rates of the fuel gas and air flowing through the pipes in order to maintain an optimum mixing ratio in the fuel reactor 72.

Flow sensors 31 according to the invention are also used in pipes for respectively supplying hydrogen and air (oxygen) to a fuel pole 74 and an air pole 75 of the fuel cell main body 73. The purpose is to encourage a smooth reaction and to improve the efficiency of power generation by measuring the flow rates of hydrogen and air supplied to the fuel cell main body 73.

The fuel cell system 71 has been expensive and large because wire-type flow sensors have been used. The use of flow sensors according to the invention makes it possible to provide a compact fuel cell system 71 at a low cost.

A flow sensor according to the invention as a whole has small ambient temperature dependence because temperature measuring elements are provided with ambient temperature dependence that cancels ambient temperature dependence attributable to factors other than the temperature measuring elements. This eliminates any need for a temperature correction circuit for correcting ambient temperature dependence unlike the prior art and to reduce the size and cost of a flow sensor.

What is claimed is:

1. A flow sensor comprising:
   a semiconductor substrate;
   an insulation layer formed as a thin film on a surface of the semiconductor substrate;
   a heating element provided on a surface of the insulation layer;
   at least one temperature measuring element provided on at least one side of the heating element on the surface of the insulation layer; and
   a gap formed at the semiconductor substrate under at least parts of the heating element and temperature measuring element, the temperature measuring element having ambient temperature dependence which cancels ambient temperature dependence of the flow sensor attributable to factors other than the temperature measuring element.

2. A flow sensor according to claim 1, wherein the temperature measuring element is a thermopile; the gap is provided under a hot contact; and the ambient temperature dependence of the thermopile is kept at a constant ratio of the ambient temperature dependence attributable to factors other than the thermopile.

3. A flow sensor according to claim 2, wherein at least a part of a material that makes up the thermopile is doped with a dopant to provide the thermopile with ambient temperature dependence that substantially cancels the ambient temperature dependence attributable to factors other than the thermopile.

4. A flow sensor according to claim 1, wherein the temperature measuring element is a thermopile; the gap is provided under a hot contact; and the ambient temperature dependence of the thermopile has an absolute value substantially equal to the ambient temperature dependence attributable to factors other than the thermopile.

5. A flow sensor according to claim 4, wherein at least a part of a material that makes up the thermopile is doped with a dopant to provide the thermopile with ambient temperature dependence that substantially cancels the ambient temperature dependence attributable to factors other than the thermopile.

6. A flow sensor according to claim 1, wherein temperature measuring elements are provided on both sides of the heating element and are spaced by a same amount, and wherein the gap opens on a surface of the semiconductor substrate in a region between the temperature measuring elements.

7. A flow sensor according to claim 3, wherein the thermopile is made of polysilicon and aluminum; phosphorus (P) is used as the dopant for controlling the ambient temperature dependence of the thermopile; and a dose of the dopant is in a range from $1.0 \times 10^{17}$ to $1.0 \times 10^{21}$ ions/cm$^3$.

8. A method of manufacturing a flow sensor, comprising:
   forming an insulation layer as a thin film on a surface of a semiconductor substrate;
   providing a heating element on a surface of the insulation layer;
   providing thermopiles on both sides of the heating element and spaced by a same distance on a surface of the insulation layer;
   forming a gap at the semiconductor substrate under regions of the thermopiles extending bonding portions at ends thereof and to the heating element, and wherein a semiconductor material is used as at least a part of a material that makes up the thermopiles; and
   wherein ambient temperature dependence of the thermopiles is kept at a substantially constant ratio to ambient temperature dependence of the flow sensor attributable to factors other than the thermopiles by controlling the dose of an impurity with which the semiconductor material is doped.

9. A fuel cell system including a flow sensor disposed within a pipe which supplies gas to a fuel reactor and/or a fuel cell main body, said flow sensor comprising:
   a semiconductor substrate;
   an insulation layer formed as a thin film on a surface of the semiconductor substrate;
   a heating element provided on a surface of the insulation layer;
   at least one temperature measuring element provided on at least one side of the heating element on the surface of the insulation layer; and
   a gap formed at the semiconductor substrate under at least parts of the heating element and temperature measuring element, the temperature measuring element having ambient temperature dependence which cancels ambient temperature dependence of the flow sensor attributable to factors other than the temperature measuring element.

10. A fuel cell system according to claim 9, wherein the temperature measuring element is a thermopile; the gap is provided under a hot contact; and the ambient temperature dependence of the thermopile is kept at a constant ratio of the ambient temperature dependence attributable to factors other than the thermopile.

11. A fuel cell system according to claim 10, wherein at least a part of a material that makes up the thermopile is doped with a dopant to provide the thermopile with ambient temperature dependence that substantially cancels the ambient temperature dependence attributable to factors other than the thermopile.

12. A fuel cell system according to claim 9, wherein the temperature measuring element is a thermopile; the gap is provided under a hot contact; and the ambient temperature dependence of the thermopile has an absolute value substantially equal to the ambient temperature dependence attributable to factors other than the thermopile.

13. A fuel cell system according to claim 12, wherein at least a part of a material that makes up the thermopile is doped with a dopant to provide the thermopile with ambient temperature dependence that substantially cancels the ambient temperature dependence attributable to factors other than the thermopile.

14. A fuel cell system according to claim 9, wherein temperature measuring elements are provided on both sides of the heating element and are spaced by a same amount, and wherein the gap opens on a surface of the semiconductor substrate in a region between the temperature measuring elements.

15. A fuel cell system according to claim 11, wherein the thermopile is made of polysilicon and aluminum; phosphorus (P) is used as the dopant for controlling the ambient temperature dependence of the thermopile; and a dose of the dopant is in a range from $1.0 \times 10^{17}$ to $1.0 \times 10^{21}$ ions/cm$^3$.

* * * * *

UNITED STATES PATENT AND TRADEMARK OFFICE
CERTIFICATE OF CORRECTION

PATENT NO. : 6,684,694 B2
DATED : February 3, 2004
INVENTOR(S) : Takeshi Fujiwara et al.

It is certified that error appears in the above-identified patent and that said Letters Patent is hereby corrected as shown below:

Title page,
Item [57], ABSTRACT,
Line 12, after the word "or" please insert -- the-- .

Column 1,
Line 17, replace "on a top" with -- on the top --;
Line 24, replace "of a surface" with -- on a surface --;
Line 36, replace "disclosed" with -- discloses --;
Line 37, replace "In an article" with -- In the article --;
Line 59, replace "where n" with -- where "n" --;
Line 61, replace "Tc represents" with -- "Tc" represents --;
Line 63, replace "Th1 represents" with -- "Th1" represents --;
Line 65, replace "Th2 represents" with -- "Th2" represents --.

Column 2,
Line 3, replace "represents a" with -- represents the --;
Lines 7-8, remove the phrase "there is no wind, or when";
Line 30, remove "the";
Line 59, replace "proportionate" with -- proportion --;
Line 65, replace "both" with -- the abovementioned --;
Line 66, insert -- also -- between "heater 6" and "changes";
Line 67, replace "In an environment in which the flow sensor 1 is used, the ambient temperature normally changes" with -- Normally, the ambient temperature changes in an environment in which flow sensor 1 is used --.

Column 3,
Line 5, remove "and";
Line 7, after the phrase "7 and 8 and", insert -- a change in --;
Line 11, replace "the" with -- a --;
Line 19, replace "formed" with -- form --;
Line 21, replace "A mid" with -- The mid --;
Line 25, replace "a mid-point" with -- the mid-point --;
Line 31, replace "to a" with -- at the --;
Line 34, replace "thermal equilibirum state" with -- state of thermal equilibirum, that is, --;
Line 37, replace "transition from the thermal equilibrium state" with -- the transition from a state of thermal equilibrium --;
Line 38, remove "a no-wind state", and replace with -- a state in which no gas flows --;
Line 42, replace "which operation occurs in a repetitive manner" with -- this procedure repeats as often as necessary to maintain said thermal equilibrium --;

UNITED STATES PATENT AND TRADEMARK OFFICE
CERTIFICATE OF CORRECTION

PATENT NO. : 6,684,694 B2
DATED : February 3, 2004
INVENTOR(S) : Takeshi Fujiwara et al.

It is certified that error appears in the above-identified patent and that said Letters Patent is hereby corrected as shown below:

Column 3 (cont'd),
Line 46, replace "of the same" with -- of the heating control unit --;
Line 53, before "decreases" insert -- also --;
Line 55, replace "same" with -- heating control unit --;
Line 58, after "19 and 20" insert -- also --;
Line 60, replace "and in" with -- as well as --.

Column 4,
Line 2, after "19 and 20" insert -- also --;
Line 6, replace "When" with -- Conversely, when --;
Line 8, delete "conversely";
Line 12, insert -- also -- between "20" and "increases";
Line 22, replace "to a" with -- into the --;
Line 23, replace "including" with -- which includes -- and replace "and having" with -- with --;
Line 24, delete "and";
Line 25, replace "are" with -- is then --;
Lines 27-28, replace "9 to correct temperature characteristics." with -- 9. --;
Line 30, replace "a correction" with -- corrections --;
Line 48, between "has" and "ambient", please insert -- an --;
Line 49, before "ambient", please insert -- the --.
Line 55, replace "has ambient" with -- has an ambient --;
Line 56, replace "cancels ambient" with -- cancels the ambient --;
Line 58, replace "has" with -- as --.

Column 5,
Line 5, replace "keep ambient" with -- keep the ambient --;
Lines 19 and 27, before "ambient", insert -- the --;
Line 26, replace "with ambient" with -- with an ambient --;
Line 27, before "ambient" insert -- the --;
Line 37, delete the second occurrence of "the";
Line 55, replace "An error of a" with -- The error --;
Line 57, replace "in" with -- within --;
Line 58, replace "which makes it" with -- it is --.

Column 6,
Line 1, replace "at" with -- in --;
Line 3, delete "and";
Line 22, replace "correcting ambient" with -- correcting the ambient --;
Line 24, replace "to cancel" with -- to easily cancel --;

UNITED STATES PATENT AND TRADEMARK OFFICE
CERTIFICATE OF CORRECTION

PATENT NO.   : 6,684,694 B2
DATED        : February 3, 2004
INVENTOR(S)  : Takeshi Fujiwara et al.

It is certified that error appears in the above-identified patent and that said Letters Patent is hereby corrected as shown below:

Column 6 (cont'd),
Line 25, delete "easily";
Line 31, replace "tow" with -- two --;
Line 47, replace "no wind" with -- no gas flow --;
Line 48, replace "wind" with -- gas flow --;
Lines 57-58, replace "the above flow sensor, any of the figures showing a" with
-- a flow sensor according to an embodiment of the invention --;
Line 66, replace "there is no wind" with -- no gas flows --;
Line 67, replace "there is a wind" with -- gas flow --.

Column 7,
Line 66, replace "While the" with -- The --.

Column 8,
Line 2, after "sink," insert -- on the other hand --;
Line 9, replace "where n" with -- where "n" --;
Line 11, replace "where Th" with -- where "Th" --;
Line 12, replace "where Tc" with -- where "Tc" --;
Lines 25-26, delete "or when there is no wind";
Line 27, delete "to a lower temperature";
Line 39, replace "in the" with -- in a --;
Line 54, replace "Any" with -- All --;
Line 58, replace "the drawings" with -- these drawings --.

Column 9,
Line 54, replace "(2) power" with -- (2) The power --;
Line 55, replace "(3) temperature" with -- (3) The temperature --.

Column 10,
Line 2, replace "when" with -- of --;
Line 3, replace "in which" with -- where --;
Line 9, delete "no-wind" and "there";
Line 10, replace "move" with -- flow --, and delete "windy";
Line 11, delete "flow;
Line 13, replace "either of" with -- both --, and delete "a";
Line 14, delete "temperature which is";
Line 26, replace "Then, a" with -- A --;
Line 33, replace "in a result" with -- in the result --;
Line 34, replace "by" with -- of --;
Line 46, replace "in" with -- when --, replace "with" with -- surrounding --, and insert
-- is -- between "heater" and "kept";

UNITED STATES PATENT AND TRADEMARK OFFICE
CERTIFICATE OF CORRECTION

PATENT NO.   : 6,684,694 B2
DATED        : February 3, 2004
INVENTOR(S)  : Takeshi Fujiwara et al.

It is certified that error appears in the above-identified patent and that said Letters Patent is hereby corrected as shown below:

Column 10 (cont'd),
Line 52, replace "Since a" with -- Since the --;
Line 53, replace "output of a" with -- output of the --;
Lines 62-63, replace "can directly result in" with -- the deviation causes the temperature measuring elements to exhibit --;
Line 66, between "num" and "used" insert -- which is --.

Column 11,
Line 2, replace "temperature characteristics" with -- temperatures --;
Line 5, replace "a" with -- "a" --;
Line 7, replace "that they" with -- the thermopiles will also have --;
Line 10, replace "a" with -- "a" --;
Line 13, replace "±" with -- plus or minus --;
Line 15, replace "in the cases of evaluation of" with -- when --;
Line 29, replace "doping them" with -- doping the thermopiles --;
Line 31, insert -- as a whole -- before "according", and delete "as a whole";
Line 51, replace "total" with -- all of the --, and replace "that are" with -- of the flow sensor, which is --.

Column 12,
Line 5, replace "total" with -- all of the --;
Line 9, replace "into consideration and by" with -- thus --;
Line 14, replace "eliminate a" with -- eliminate the --;
Lines 15-16, replace "to correct temperature characteristics, which" with -- and thus --;
Line 34, replace "a wind" with -- flow --;
Line 35, replace "process" with -- based --;
Line 56, replace "By measuring" with -- Measuring --;
Lines 58-60, replace "the reaction is controlled to smoothly proceed and generation efficiency of electric power is enhanced" with -- allows for smooth control of the reaction and enhanced efficiency in power generation --.
Line 61, replace "Owing" with -- Due --;
Line 62, delete "in size";
Line 64, before "less" insert -- smaller and --, and delete "and smaller size";
Line 65, replace "achieved" with -- made --.

Column 13,
Line 30, replace "to reduce" with -- reduces --;
Line 42, replace "at" with -- in --.

UNITED STATES PATENT AND TRADEMARK OFFICE
CERTIFICATE OF CORRECTION

PATENT NO. : 6,684,694 B2
DATED : February 3, 2004
INVENTOR(S) : Takeshi Fujiwara et al.

It is certified that error appears in the above-identified patent and that said Letters Patent is hereby corrected as shown below:

Column 14,
Line 26, replace "at" with -- in --;
Line 48, replace "at" with -- in --.

Signed and Sealed this

Twenty-seventh Day of December, 2005

JON W. DUDAS
*Director of the United States Patent and Trademark Office*